(12) United States Patent
Masuyama

(10) Patent No.: US 6,947,250 B2
(45) Date of Patent: Sep. 20, 2005

(54) DISK STORAGE APPARATUS

(75) Inventor: Hidekazu Masuyama, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 214 days.

(21) Appl. No.: 10/351,048

(22) Filed: Jan. 24, 2003

(65) Prior Publication Data

US 2004/0036998 A1 Feb. 26, 2004

(30) Foreign Application Priority Data

Aug. 26, 2002 (JP) ........................................ 2002-245847

(51) Int. Cl.[7] ............................................. G11B 5/596
(52) U.S. Cl. ................................................. 360/78.04
(58) Field of Search ............................. 360/78.04, 22, 360/69, 75, 77.01, 77.08; 369/44.32; 386/7

(56) References Cited

U.S. PATENT DOCUMENTS

| | | | | |
|---|---|---|---|---|
| 4,006,394 A | * | 2/1977 | Cuda et al. ............... 360/78.04 |
| 4,680,744 A | * | 7/1987 | Kanamaru ................ 369/44.32 |
| 4,724,495 A | * | 2/1988 | Hedberg et al. ............... 360/22 |
| 4,751,586 A | * | 6/1988 | Rodal ............................. 386/7 |
| 5,144,503 A | * | 9/1992 | Fukushima et al. ........... 360/69 |
| 5,301,072 A | * | 4/1994 | Wilson .................... 360/77.01 |
| 5,420,730 A | * | 5/1995 | Moon et al. ............. 360/77.08 |
| 6,018,435 A | | 1/2000 | Uno et al. ................ 360/78.14 |
| 6,061,198 A | * | 5/2000 | Shrinkle ....................... 360/75 |
| 6,067,206 A | * | 5/2000 | Hull et al. ............... 360/77.08 |
| 6,204,984 B1 | | 3/2001 | Uno et al. ..................... 360/69 |
| 6,567,230 B1 | * | 5/2003 | Kagami et al. ............... 360/75 |

* cited by examiner

Primary Examiner—David Hudspeth
Assistant Examiner—Fred F. Tzeng
(74) Attorney, Agent, or Firm—Greer, Burns & Crain, Ltd.

(57) ABSTRACT

In a disk storage apparatus, an micro processing unit (MPU) as an upper unit calculates a positional relationship between a head section and storage disks using disk management data indicating the positional relationship of servo information among the storage disks to complete a servo lock based on the result of calculation. The servo lock can thereby be executed at high rate without waiting for a disk controller as a lower unit to complete a servo lock.

9 Claims, 8 Drawing Sheets

FIG.2
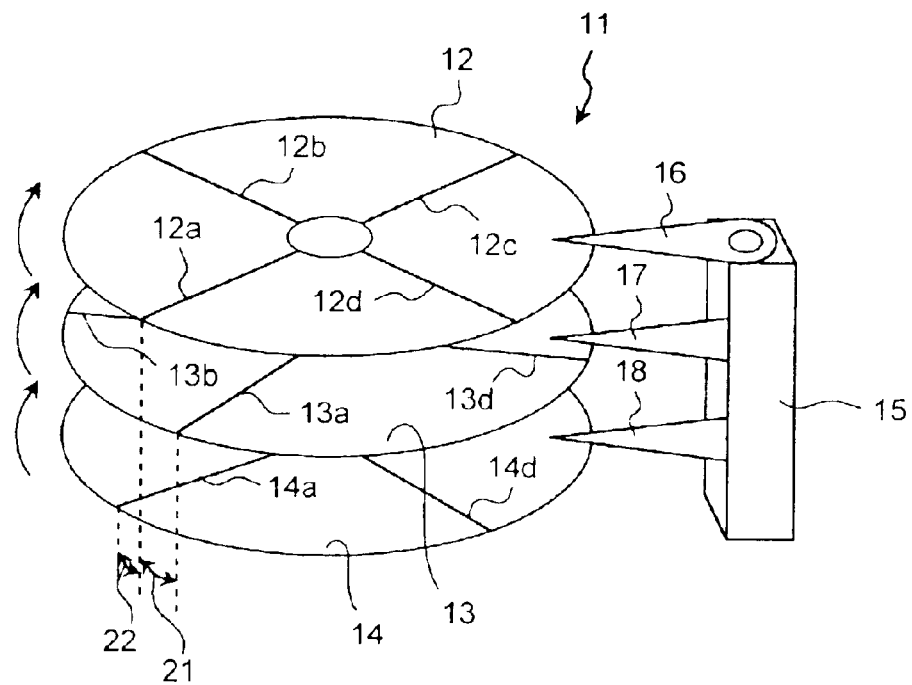
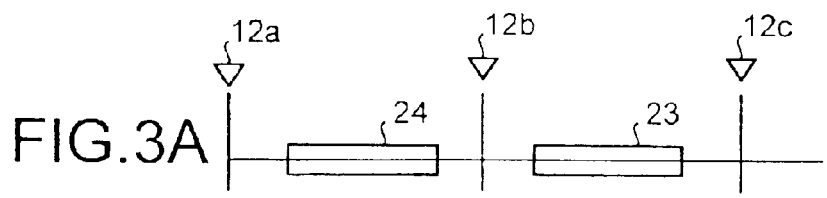
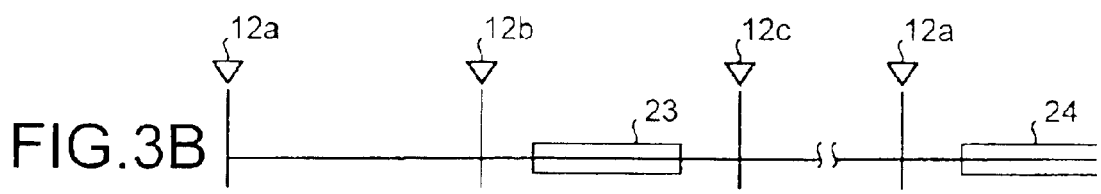
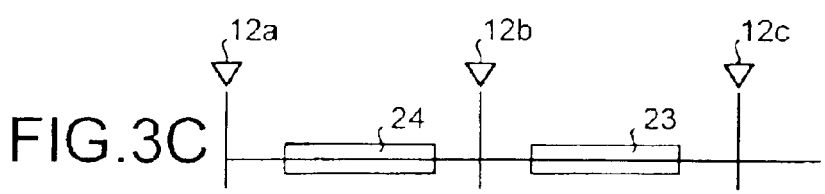

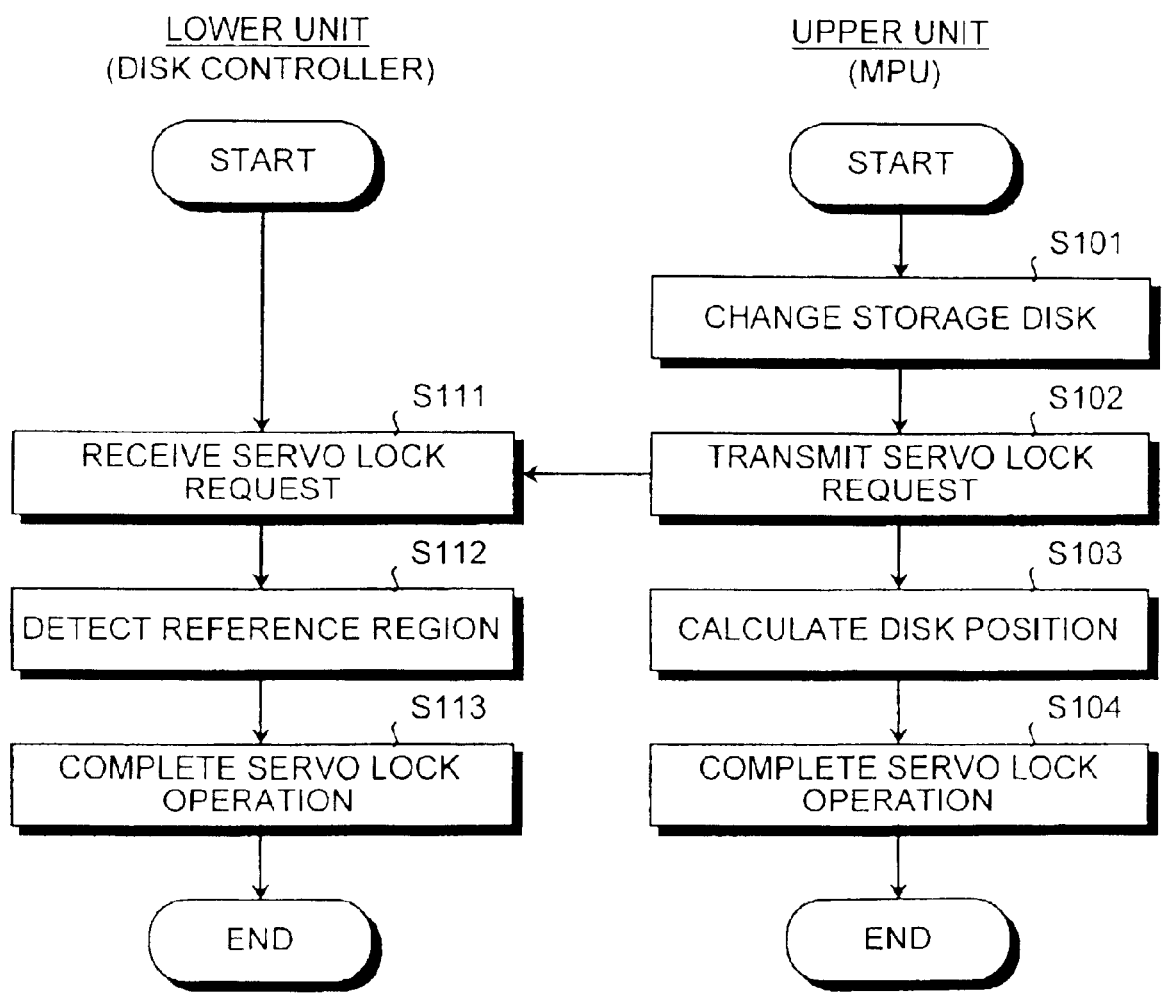

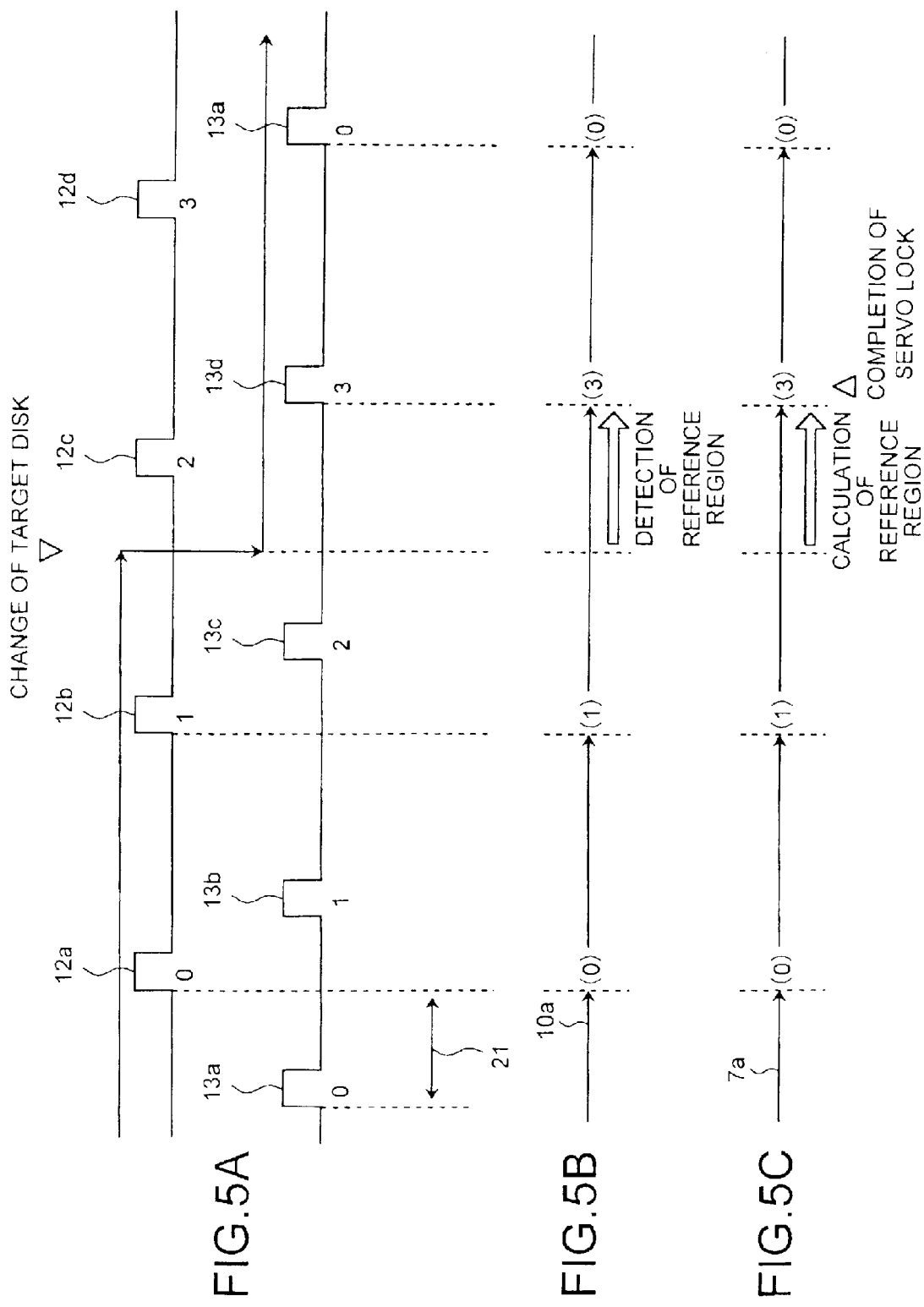

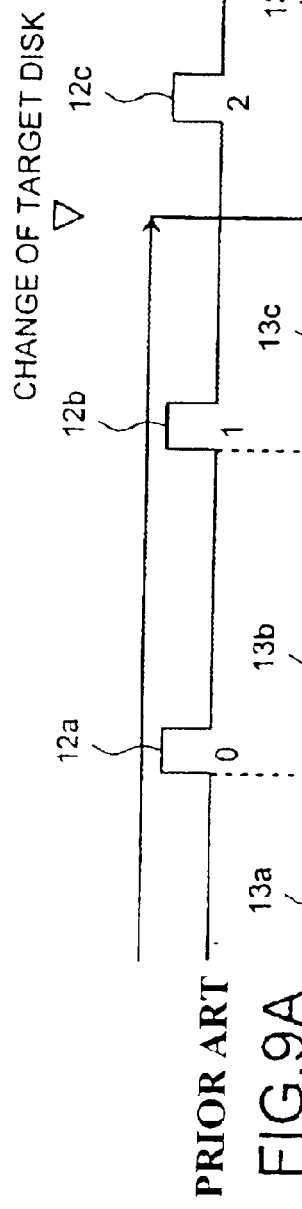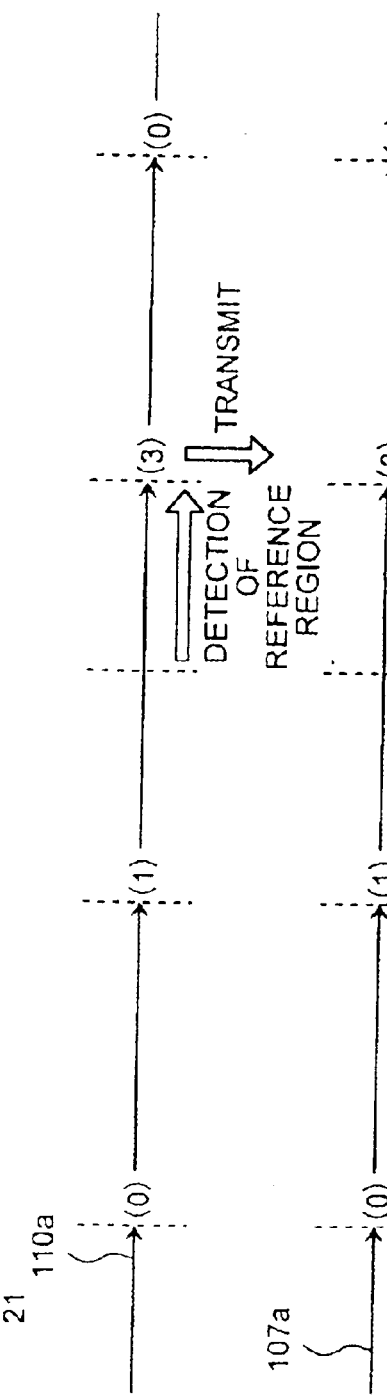

DISK STORAGE APPARATUS

BACKGROUND OF THE INVENTION

1) Field of the Invention

The present invention relates to a disk storage apparatus that includes an upper unit that manages data to be stored in storage disks, and a lower unit that controls the operation of the storage disks to perform a servo lock of its own. More particularly, this invention relates to a disk storage apparatus capable of performing a servo lock of an upper unit at high rate.

2) Description of the Related Art

Conventionally, a disk storage apparatus has been employed as a storage medium that stores data. This disk storage apparatus allocates storage regions in which the data is stored, on a storage disk, and rotates the storage disk, thereby adjusting a positional relationship between a head section that accesses the storage regions and the storage disk, and reading and writing the data from and to a desired storage region.

In order to position the head section and the storage disk, positioning data is recorded on the storage disk. This data used to position the storage disk and the head section will be referred to as "servo information" hereinafter. The disk storage apparatus reads this servo information and thereby grasps the positional relationship between the storage disk and the head section. Such an operation for reading the servo information and grasping the positional relationship between the storage disk and the head section is referred to as "servo lock".

In addition, the disk storage apparatus includes an upper unit that transmits and receives commands and manages the data stored in the storage disk, and a lower unit that conducts physical operation control over the storage disk and the head section. Since the upper unit and the lower unit operate independently of each other, it is necessary that the upper unit and the lower unit individually perform servo lock operations.

As the storage disk used in the disk storage apparatus, a magnetic disk that magnetically reads and writes data, or an optical disk that reads and writes data using a laser beam is employed. Since a disk storage apparatus that employs the magnetic disk can easily write and read data at high rate, this disk storage apparatus is particularly effective in storage of data written with high frequency.

Further, following the recent improvement in the processing capability of information terminals, it is possible to process a large capacity of data at high rate. To this end, it is desired to increase the storage capacity of a disk storage apparatus and to enable the disk storage apparatus to process data at high rate. To realize a mass storage disk storage apparatus, a plurality of storage disks is provided in a single disk storage apparatus. The disk storage apparatus having a plurality of storage disks collectively rotates the storage disks in the same direction, and includes heads that access the respective storage disks in the head section.

A conventional disk storage apparatus will next be explained with reference to FIGS. 7 to 9. FIG. 7 shows a schematic block diagram of the schematic configuration of the conventional disk storage apparatus. In FIG. 7, a disk storage apparatus 102 is connected to a host 101. The disk storage apparatus 102 includes therein an interface section 103, a micro processing unit (MPU) 104, a disk controller 108, and a disk section 111. The MPU 104 is connected to a buffer 105, a flash read only memory (flash ROM) 106, and a random access memory (RAM) 107. The disk controller 108 is connected to a flash ROM 109, and a RAM 110.

The interface section 103 transmits a request from the host 101 to the MPU 104. The MPU 104 functions as an upper unit that transmits and receives commands and manages the data stored in a storage disk. Specifically, the MPU 104 transmits a read command as a data read request and a write command as a data write request to the disk controller 108 in accordance with the request from the host 101. The buffer 105 functions as a storage region that temporarily stores the command until the MPU 104 transmits the command to the disk controller 108. In addition, the MPU 104 performs file management so as to manage each relationship between storage regions and data written in corresponding storage regions on the storage disks. For this file management, the RAM 107 is used as the storage region. The flash ROM 106 stores a program that is executed by the MPU 104. By reading the program stored in the flash ROM 106 when the disk storage apparatus is activated, it is possible to execute the program required for the operation of the MPU 104.

The disk controller 108 functions as a lower unit that controls the operation of the disk section 111 including a plurality of storage disks and a head section, and that executes the read command and the write command received from the MPU 104. The disk controller 108 uses the RAM 110 as a storage region for the operation thereof. The flash ROM 109 stores a program that is executed by the disk controller 108. By reading the program stored in the flash ROM 109 when the disk storage apparatus 102 is activated, it is possible to execute the program required for operation of the disk controller 108.

The servo lock performed by the conventional disk storage apparatus 102 will next be explained. The disk storage apparatus 102 needs to read servo information stored in the storage disks and to perform servo lock in order to access a desired storage region on the storage disks. The disk storage apparatus 102 includes the MPU 104 that functions as the upper unit and the disk controller 108 that functions as the lower unit. Since the MPU 104 and the disk controller 108 operate independently of each other, it is necessary that the disk controller 108 and the MPU 104 individually perform servo lock operations.

Therefore, the disk controller 108 includes therein a servo information detector 108a. This servo information detector 108a detects servo information from the storage disks, and reads content of the servo information. The disk controller 108 stores the content as a value of a servo counter 110a in the RAM 110, thereby executing a servo lock operation. Further, the disk controller 108 transmits the value of the servo counter 110a to the MPU 104. The MPU 104 stores the value of the servo counter 110a received from the disk controller 108 as a value of a servo counter 107a, thereby executing a servo lock operation.

The disk controller 108 has the RAM 110 that includes disk management data 110b, and checks a servo lock result using this disk management data 110b. The disk management data 110b indicates a positional relationship between a plurality of storage disks where pieces of servo information are stored, respectively. Since the storage disks are collectively rotated in the same direction, the positional relationship of the pieces of servo information among the storage disks is determined at the time of manufacturing the disk storage apparatus 102 and is not changed thereafter. By storing the positional relationship of the servo information as the disk management data 110b, the disk controller 108 can calculate and predict servo information to be read next by the servo information detector 108a if a target storage disk to be accessed is changed. The disk controller 108 compares the servo information read by the servo information detector 108a with the servo information calculated from the disk management data 110b. If the two pieces of servo information coincide with each other, the disk controller 108 determines that the servo lock operation has been normally executed. If the two pieces of servo information do not coincide, the disk controller 108 outputs a servo lock error indicating that the servo lock operation has not been normally completed.

The servo lock processing operation of the disk storage apparatus 102 will next be explained with reference to FIG. 8. FIG. 8 shows a flow chart of the servo lock processing operation of the disk storage apparatus 102. In FIG. 8, if the request received from the host 101 requires the change of the storage disk, the MPU 104, serving as an upper unit, determines that it is necessary to change the storage disk (at step S301). The MPU 104 then transmits a request for servo lock ("servo lock request") as well as a request for the change of the storage disk, to the disk controller 108 serving as a lower unit (at step S302).

The disk controller 108 receives the servo lock request from the MPU 104 (at step S311), and detects servo information (at step S312). Further, the disk controller 108 stores the content of the detected servo information as a value of a servo counter, and completes a servo lock operation (at step S313). The disk controller 103 then transmits the value of the servo counter to the MPU 104 (at step S314), thereby finishing the processing.

The MPU 104 receives the value of the servo counter from the disk controller 108 (at step S303), completes a servo lock operation based on the received value of the servo counter (at step S304), and finishes the processing.

Specifically, the servo lock processing of the disk storage apparatus 102 is performed as shown in FIGS. 9A to 9C. FIGS. 9A to 9C show explanatory views of the operation of the disk section 111 and servo lock timings. FIG. 9A shows the servo information of the storage disks, and the access positions of the head section. FIG. 9B shows the change of the value of the servo counter 110a used by the disk controller 108. FIG. 9C shows the change of the value of the servo counter 107a used by the MPU 104.

In FIG. 9A, pieces of servo information 12a, 12b, 12c, and 12d are servo information on the same storage disk. The servo information 12a has a value "0", the servo information 12b has a value "1", the servo information 12c has a value "2", and the servo information 12d has a value "3". Likewise, pieces of servo information 13a, 13b, 13c, and 13d are servo information on the same storage disk. The servo information 13a has a value "0", the servo information 13b has a value "1", the servo information 13c has a value "2", and the servo information 13d has a value "3".

If the servo information detector 108a detects the servo information 12a and reads the value "0" thereof, then the disk controller 108 sets the servo counter 110a at "0" and the MPU 104 sets the servo counter 107a at "O". If the servo information detector 108a detects the servo information 12b and reads the value "1" thereof, then the disk controller 108 sets the servo counter 110a at "1" and the MPU 104 sets the servo counter 107a at "1".

If a request for the change of the storage disk is received from the host 101, the head section changes a target storage disk to be accessed and detects servo information from the changed storage disk. As a result, the servo information detector 108a detects the servo information 13d and reads the value "3" thereof. The disk controller 108 sets the value "3" detected by the servo information detector 108a to the servo counter 110a, and also transmits the value "3" to the MPU 104. The MPU 104 sets the servo counter 107a based on the value received from the disk controller 108. However, because of time lag, the MPU 104 completes the servo lock operation by the value "0" held by the next servo information 13a.

As can be seen, in the conventional disk storage apparatus 102, the servo information provided on the storage disk is detected, the disk controller 108, serving as a lower unit, executes servo lock, and the MPU 104, serving as an upper unit, executes servo lock based on the servo lock result of the disk controller 108. By doing so, the disk controller 108 and the MPU 104 grasp each positional relationship between the storage disks and the heads, whereby data is read and written from and to a desired storage region.

However, the conventional disk storage apparatus has the following problem. Since the MPU 104 performs servo lock based on the servo lock result of the disk controller 108, it takes time for the MPU to complete the servo lock.

Therefore, the conventional disk storage apparatus cannot satisfy the demand for accelerating processing. In addition, to realize a mass storage disk storage apparatus, the number of storage disks tends to increase. As a result, the frequency of movement of one storage disk to the other increases, and therefore the problem that it takes time to complete servo lock is getting more significant.

Furthermore, the servo lock result of the disk controller 108 is used as the servo lock result of the MPU 104 as it is. Therefore, if the disk controller 108 erroneously completes its servo lock operation, the MPU 104 disadvantageously completes its servo lock operation based on the erroneous servo lock data.

SUMMARY OF THE INVENTION

It is an object of this invention to provide a disk storage apparatus that can execute servo lock at high rate and can detect a servo lock error of a lower unit.

The disk storage apparatus according to one aspect of this invention comprises an upper unit that manages data stored in storage disks, and a lower unit that controls an operation of the storage disks. The lower unit includes a first storage unit that stores first management data indicating a positional relationship of servo information on the storage disks, reads the servo information on the storage disks, and compares the first management data with the read servo information to perform a servo lock. The upper unit includes a second storage unit that stores second management data indicating a positional relationship of the servo information on the storage disks, and a servo lock prediction unit that predicts a result of the servo lock of the lower unit from the second management data, and determines that the servo lock of its own is completed based on the result of the predicted servo lock of the lower unit.

The disk storage apparatus according to another aspect of this invention comprises an upper unit that manages data stored in storage disks, a lower unit that controls an operation of the storage disks, and a storage unit that stores management data indicating a positional relationship of the servo information on the storage disks. The lower unit reads servo information on the storage disks, and compares the management data with the read servo information to perform a servo lock. The upper unit includes a servo lock prediction unit that predicts a result of the servo lock of the lower unit from the management data, and determines that the servo lock of its own is completed based on the predicted servo lock result of the lower unit.

These and other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 2 shows a block diagram of the schematic configuration of a disk section shown in FIG. 1, FIGS. 3A to 3C show explanatory views of the improvement in access efficiency attained by an MPU shown in FIG. 1, FIG. 4 shows a flow chart of a servo lock processing operation;

FIGS. 5A to 5C show explanatory views of the operation of the disk section shown in FIG. 1 and servo lock timings, FIGS. 9A to 9C show explanatory views of the operation of the conventional disk section and servo lock timings.

DETAILED DESCRIPTIONS

An embodiment of the disk storage apparatus according to the present invention will be explained in detail below with reference to the accompanying drawings.

Figure 1:
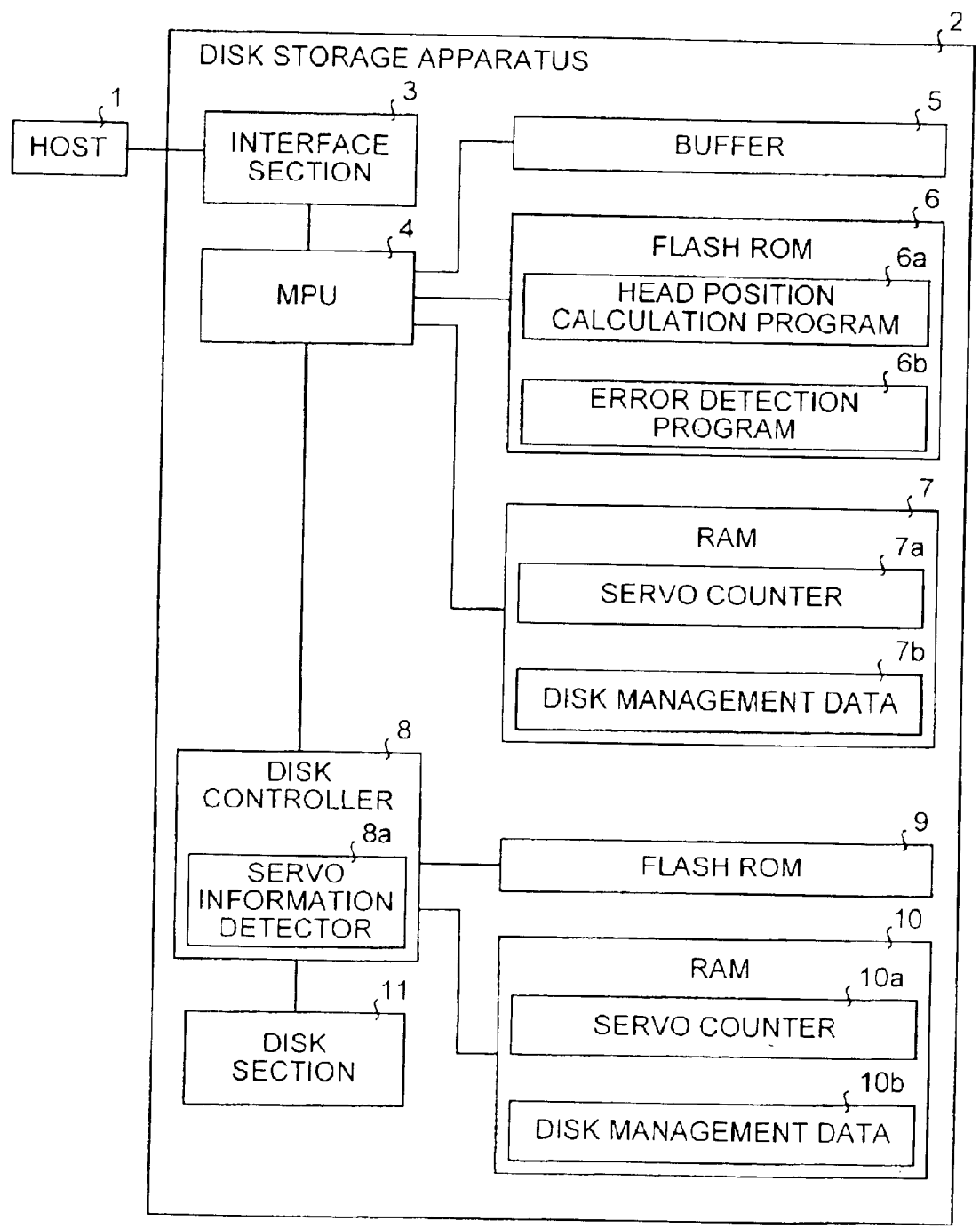
FIG. 1 shows a block diagram of the schematic configuration of a disk storage apparatus according to an embodiment of the present invention.

FIG. 1 shows a block diagram of the schematic configuration of a disk storage apparatus in this embodiment. In FIG. 1, a disk storage apparatus 2 is connected to a host 1. The disk storage apparatus 2 includes an interface section 3, a micro processing unit (MPU) 4, a disk controller 8, and a disk section 11. The MPU 4 is connected to a buffer 5, a flash read only memory (flash ROM) 6, and a random access memory (RAM) 7. The disk controller 8 is connected to a flash ROM 9, and a RAM 10.

The interface section 3 transmits a request from the host 1 to the MPU 4. The MPU 4 functions as an upper unit that transmits and receives commands, and manages data stored in storage disks. Specifically, the MPU 4 transmits a read command as a data read request and a write command as a data write request to the disk controller 8 in accordance with the request from the host 1. The buffer 5 functions as a storage region that temporarily stores the command until the MPU 4 transmits the command to the disk controller 8. In addition, the MPU 4 performs file management so as to manage each relationship between storage regions and data written in corresponding storage regions on the storage disks. For this file management, the RAM 7 is used as the storage region. The flash ROM 6 stores a program executed by the MPU 4. By reading the program stored in the flash ROM 6 when the disk storage apparatus is activated, it is possible to execute the program required for the operation of the MPU 4.

The disk controller 8 functions as a lower unit that controls the operation of the disk section 11 including a plurality of storage disks and a head section, and that executes the read command and the write command received from the MPU 4. The disk controller 8 uses the RAM 10 as a storage region related to the operation thereof. The flash ROM 9 stores the program that is executed by the disk controller 8. By reading the program stored in the flash ROM 9 when the disk storage apparatus 2 is activated, it is possible to execute the program required for the operation of the disk controller 8.

The disk section 11 will next be explained. FIG. 2 shows the schematic configuration of the disk section 11. In FIG. 2, the disk section 11 includes storage disks 12, 13, and 14, and a head section 15. The storage disk 12 has pieces of servo information 12a, 12b, 12c, and 12d, and storage regions, not shown, provided on the surface thereof. Likewise, the storage disk 13 has pieces of servo information 13a, 13b, 13c, and 13d, and storage regions, not shown, provided on the surface thereof. The storage disk 14 has pieces of servo information 14a, 14b, 14c, and 14d, and storage regions, not shown, provided on the surface thereof. The head section 15 includes a head 16 that accesses the storage disk 12, a head 17 that accesses the storage disk 13, and a head 18 that accesses the storage disk 14.

This disk section 11 fixes the head section 15, and rotates the storage disks 12, 13, and 14, thereby accessing a desired storage region in the storage disks 12, 13, and 14. In addition, the pieces of the servo information 12a, 12b, 12c, 12d, 13a, 13b, 13c, 13d, 14a, 14b, 14c, and 14d are used as a reference to position the storage disks 12, 13, and 14 and the head section 15, and to enable accessing the desired storage region.

The storage disks 12, 13, and 14 are collectively rotated in the same direction. Therefore, the positional relationship of the pieces of servo information among the storage disks is determined when the disk storage apparatus 2 is manufactured, and is not changed thereafter. Ideally, the pieces of servo information of the respective storage disks are produced so that even if a target storage disk to be accessed changes, the positional relationship remains the same. However, the regions in which the pieces of servo information are recorded are very fine. It is, therefore, difficult both technically and economically to align positions of the servo information among the respective storage disks. In FIG. 2, there is a positional slippage 21 between the servo information 12a of the storage disk 12 and the servo information 13a of the storage disk 13, and there is a positional slippage 22 between the servo information 12a of the storage disk 12 and the servo information 14a of the storage disk 14.

The disk storage apparatus 2 reads the pieces of servo information of the storage disks using the heads, respectively, thereby performing servo lock to grasp the positional relationship between the storage disks and the heads. In addition, the disk storage apparatus 2 includes therein the MPU 4 that serves as an upper unit and the disk controller 8 that serves as a lower unit. Since the MPU 4 and the disk controller 8 operate independently of each other, it is necessary that the MPU 4 and the disk controller 8 individually perform servo lock operations.

The disk controller 8 realizes precise access to the storage disks by performing the servo lock operation. The MPU 4 realizes the management of the data stored in the storage disks, the improvement in efficiency for access to the storage disks and the acceleration of access thereto. The data management means herein a processing for associating the storage regions of the storage disks with pieces of data written thereto, and storing information as to which data is written to which storage region, i.e., the arrangement of the data on the storage disks in the RAM 7.

The improvement in efficiency for access to the storage disks and the acceleration of access thereto mean a processing for controlling command processing order, if an access request from the host 1 is transmitted to the disk controller 8 as a command, in accordance with the arrangement of the pieces of data on the storage disks and the positional relationship between the head section and the storage disks at that time. FIGS. 3A to 3C show explanatory views of the improvement in access efficiency achieved by the MPU 4. FIG. 3A shows an example of the request transmitted from the host 1 to the MPU 4. FIG. 3B shows a processing order if the MPU 4 does not improve access efficiency. FIG. 3C shows a processing order if the MPU 4 improves access efficiency.

As shown in FIG. 3A, it is assumed that the storage disk 12 stores data 24 between the servo information 12a and the servo information 12b, and data 23 between the servo information 12b and the servo information 12c. It is also assumed that the host 1 transmits a data read request to read the data 23 first and a data read request to read the data 24 next. In this case, if the MPU 4 does not perform a servo lock operation, the MPU 4 is supposed to sequentially process the received requests. That is, as shown in FIG. 3B, the MPU 4 transmits a read command for reading the data 23 first and a read command for reading the data 24 next. Accordingly, the disk controller 8 detects the servo information 12b to thereby read the data 23 first, and then detects the servo information 12a to thereby read the data 24.

If the MPU 4 performs a servo lock operation and thereby grasps the positional relationship between the storage disks and the head section, the MPU 4 can change the processing order for processing the received requests based on a servo lock result. That is, as shown in FIG. 3C, the MPU 4 transmits the read command for reading the data 24 first, and the read command for reading the data 23 next. Accordingly, the disk controller 8 can detect the servo information 12a to thereby read the data 24 first, and then detect the servo information 12b to thereby read the data 23. Thus, if the MPU 4 performs the servo lock operation, it is possible to improve efficiency for access to the storage disks and to accelerate the access.

The servo lock operations of the disk controller 8 and the MPU 4 will next be explained. The disk controller 8 includes therein the servo information detector 8a. The disk controller 8 detects servo information on the storage disks using this servo information detector 8a, and stores the value held by the servo information in the RAM 10 as a value of the servo counter 10a, thereby executing a servo lock operation.

The disk controller 8 has the RAM 10 that includes the disk management data 10b. Using this disk management data 10b, the disk controller 8 checks a result of the servo lock operation. The disk management data 10b is data indicating the positional relationship of pieces of servo information among a plurality of storage disks. Specifically, the positional slippages 21 and 22 are stored as data. If a target storage disk to be accessed is changed, the disk controller 8 allows the servo information detector 8a to calculate and predict the value of servo information to be detected next using the disk management data 10b. The disk controller 8 compares the value of the servo information detected by the servo information detector 8a with the value of the servo information calculated based on the disk management data 10b. If both values of the servo information coincide with each other, the disk controller 8 determines that the servo lock operation has been normally executed. If both values do not coincide, the disk controller 8 outputs a servo lock error indicating that the servo lock operation has not been normally completed.

Meantime, the MPU 4 has the RAM 7 that includes disk management data 7b. Using this disk management data 7b, the MPU 4 performs a servo lock operation. The disk management data 7b is data indicating the positional relationship of pieces of servo information among a plurality of storage disks and is equal in content to the disk management data 10b. If a target storage disk to be accessed needs to be changed, the MPU 4 calculates the value of servo information to be detected next by the servo information detector 8a using the disk management data 7b, stores the value held by the servo information thus calculated in the RAM 7 as a value of a servo counter 7a, thereby executing the servo lock operation. That is, the MPU 4 executes the servo lock operation independently of the servo lock operation of the disk controller 8.

The servo lock processing operation of the disk storage apparatus 2 will be described below with reference to FIG. 4. FIG. 4 shows a flow chart of the servo lock processing operation of the disk storage apparatus 2. In FIG. 4, if the request from the host 1 requires the change of the storage disk, the MPU 4, serving as the upper unit, determines that it is necessary to change the storage disk first (at step S101). The MPU 4 then transmits a servo lock request as well as a request for change of the storage disk to the disk controller 8 serving as a lower unit (at step S102).

Thereafter, the MPU 4 calculates servo information to be detected next by the servo information detector 8a using the disk management data 7b (at step S103), and stores the value of the servo information thus calculated in the RAM 7 as a value of the servo counter 7a to complete the servo lock operation (at step S104), thereby finishing the processing.

On the other hand, the disk controller 8 receives the servo lock request from the MPU 4 (at step S11), and detects servo information (at step S112). The disk controller 8 stores the detection result of this servo information in the RAM 10 as a value of the servo counter 10a to complete a servo lock operation (at step S113), thereby finishing the processing.

Specifically, the disk storage apparatus 2 performs servo lock as shown in FIGS. 5A to 5C. FIGS. 5A to 5C show explanatory views of the operation of the disk section 11 and servo lock timings. FIG. 5A shows the pieces of servo information provided on the storage disks 12 to 14, respectively, and the access position of the head section 15. FIG. 5B shows the change of the value of the servo counter 10a used by the disk controller 8. FIG. 5C shows the change of the value of the servo counter 7a used by the MPU 4.

In FIG. 5A, the servo information 12a provided on the storage disk 12 has a value "0", the servo information 12b has a value "1", the servo information 12c has a value "2", and the servo information 12d has a value "3". The servo information 13a provided on the storage disk 13 has a value "0", the servo information 13b has a value "1", the servo information 13c has a value "2", and the servo information 13d has a value "3".

If a target storage disk to be accessed is changed from the storage disk 12 to the storage disk 13 in response to the request from the host 1, the head section 15 changes the storage disk 12 to the storage disk 13, and detects servo information from the storage disk 13. As a result, the servo information detector 8a detects the servo information 13d and reads the value "3" thereof. The disk controller 8 sets the value "3" detected by the servo information detector 8a in the servo counter 10a and completes the servo lock operation. Meantime, the MPU 4 calculates servo information to be detected next by the servo information detector 8a using the value of the servo counter 7a at that time and the disk management data 7b. The MPU 4 stores the value "3" held by the calculated servo information in the RAM 7 as a value of the servo counter 7a, thereby completing the servo lock operation.

That is, the MPU 4 can complete the servo lock operation independently of that of the disk controller 8 without waiting for the disk controller 8 to finish the servo lock operation. Even if the target storage disk to be accessed is changed, the MPU 4 can instantly perform a servo lock operation.

In this embodiment, the MPU 4 performs a servo lock operation independently of that of the disk controller 8, thereby accelerating servo lock. Further, by comparing the servo counter 7a indicating the result of the servo lock operation performed by the MPU 4 with the servo counter 10a indicating the result of the servo lock operation performed by the disk controller 8, it is possible to determine that the disk controller 8 has normally finished its servo lock operation.

Figure 6:
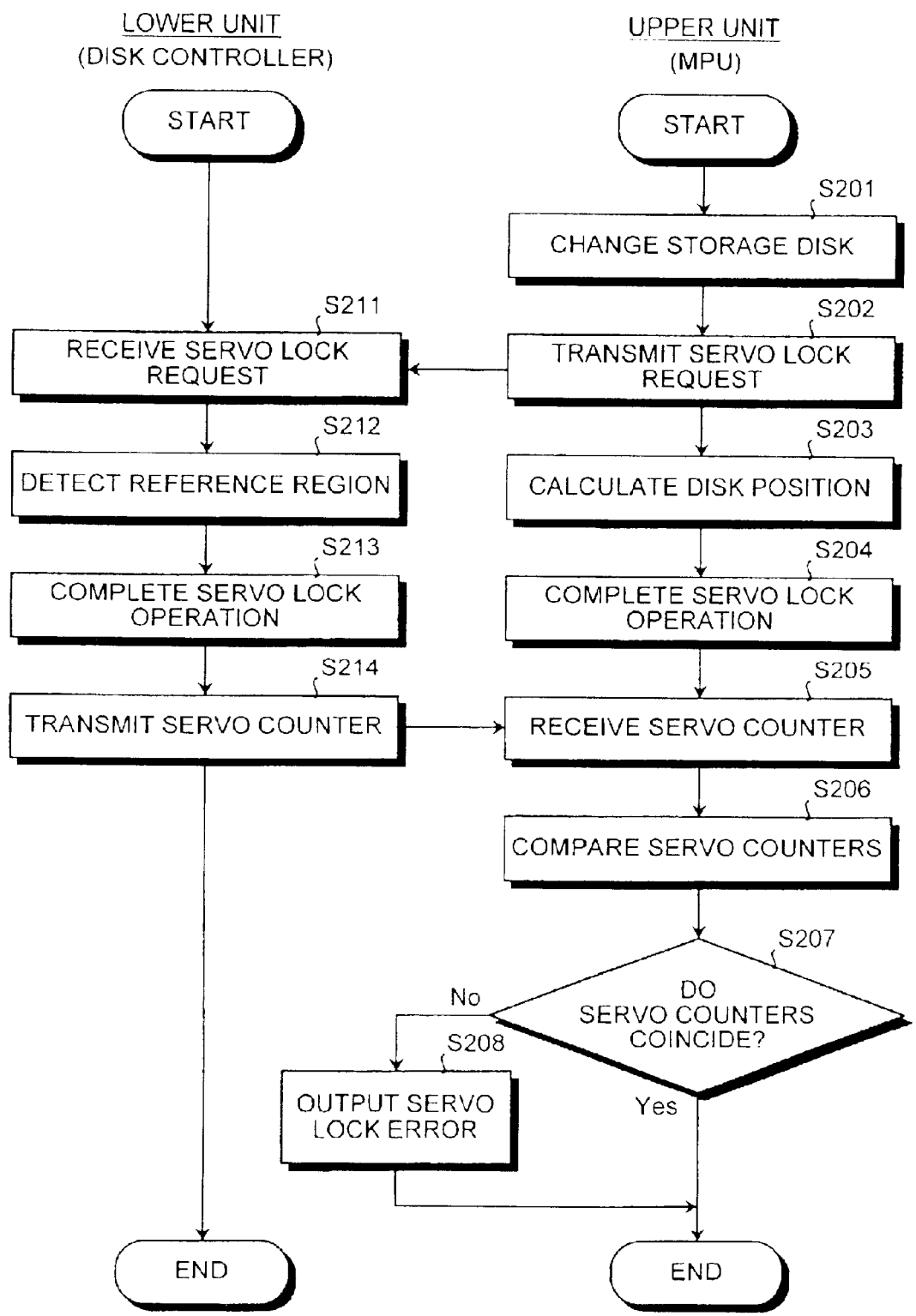
FIG. 6 shows a flow chart of a servo lock processing operation if servo counters are checked.
Figure 7:
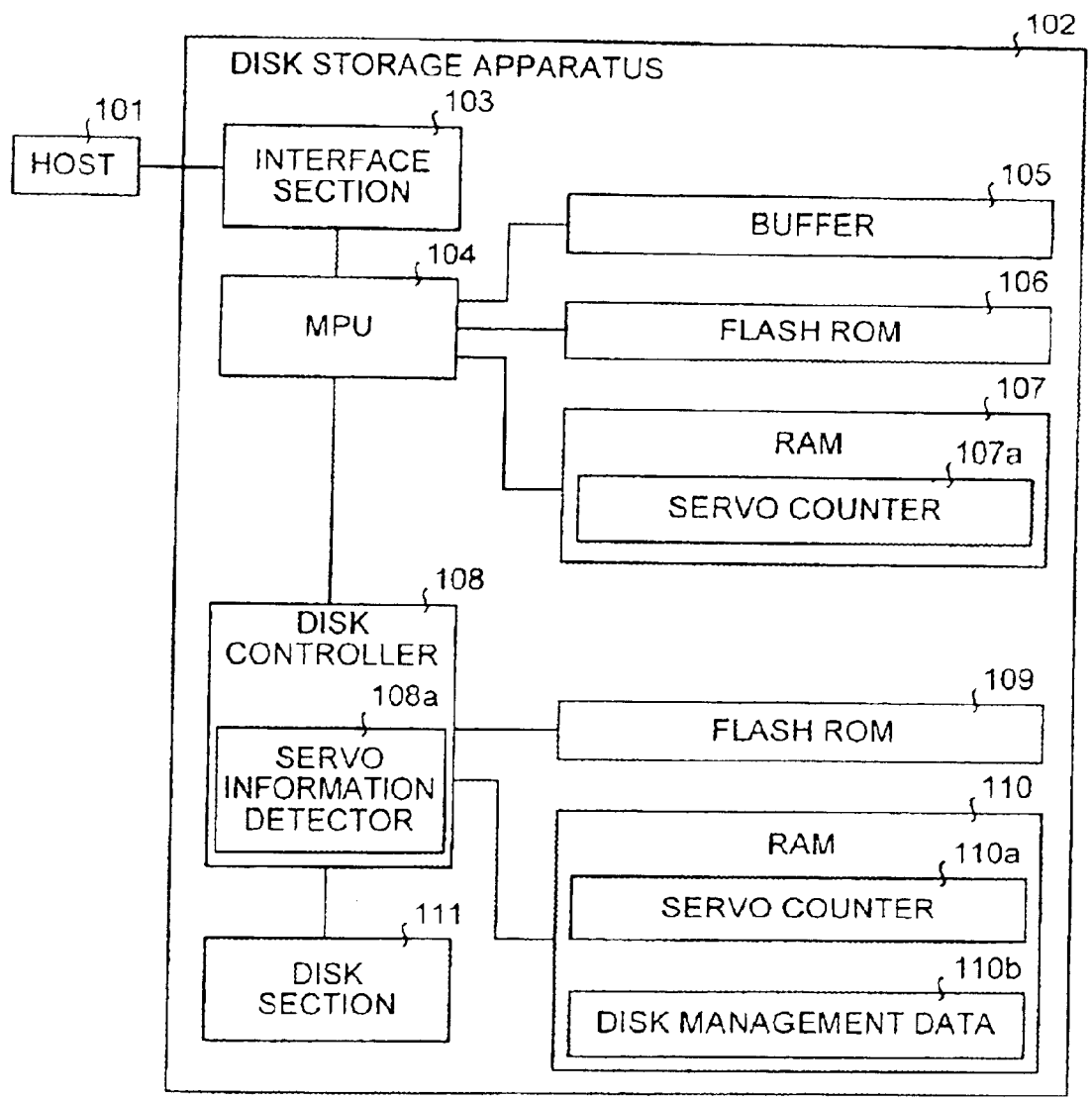
FIG. 7 shows a block diagram of the schematic configuration of the conventional disk storage apparatus.
Figure 8:
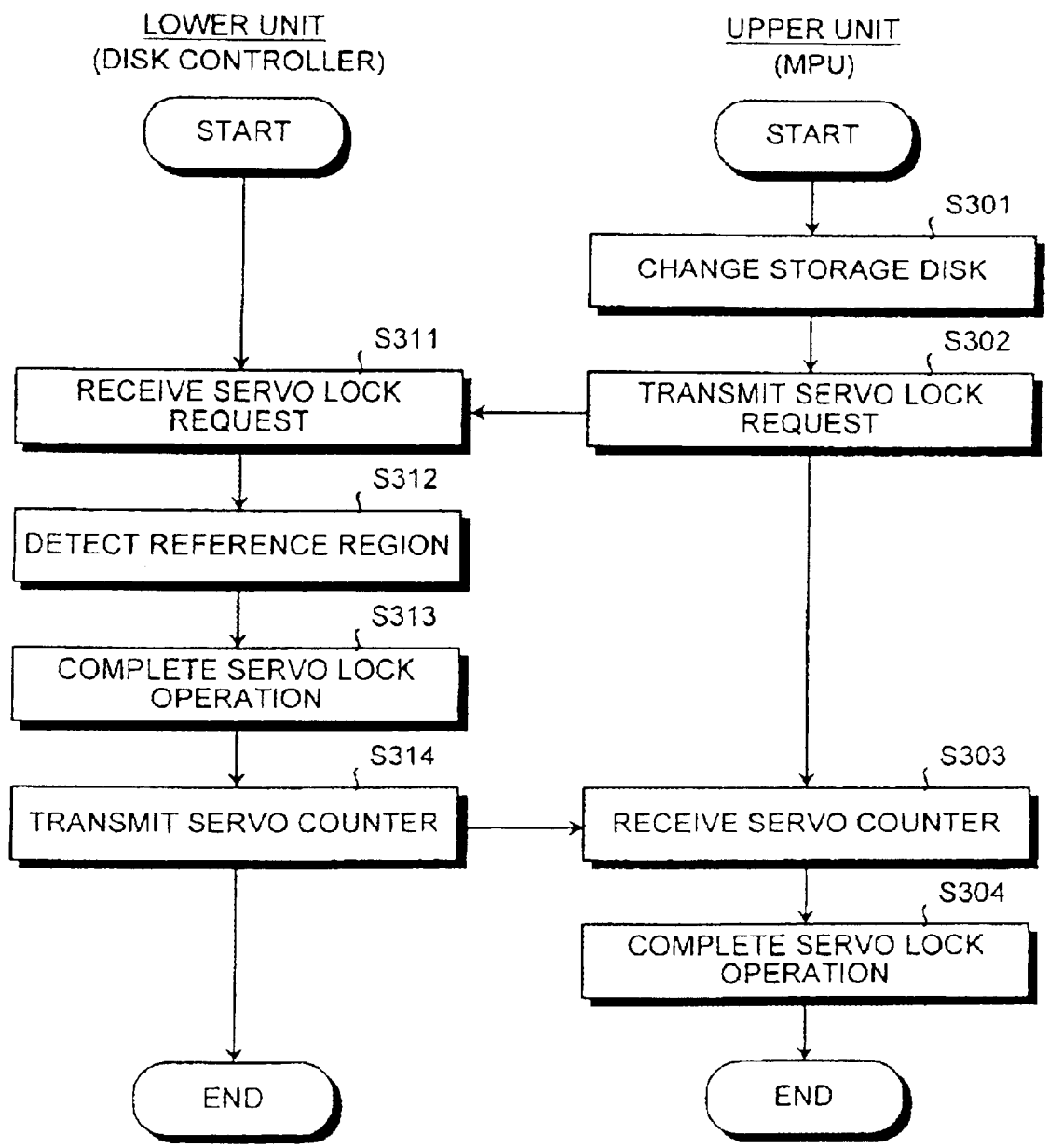
FIG. 8 shows a flow chart of the servo lock processing operation of the conventional disk storage apparatus.

FIG. 6 shows a flow chart of the processing operation of the servo lock if the servo counters are checked. In FIG. 6, when the request received from the host 1 requires the change of the storage disk, the MPU 4, serving as the upper unit, determines that it is necessary to change the storage disk first (at step S201). The MPU 4 then transmits a servo lock request as well as a request for the change of the storage disk to the disk controller 8 serving as a lower unit (at step S202).

Thereafter, the MPU 4 calculates servo information to be detected next by the servo information detector 8a using the disk management data 7b (at step S203), stores the value held by the servo information thus calculated in the RAM 7 as a value of the servo counter 7a, and thereby completes the servo lock operation (at step S204).

On the other hand, the disk controller 8 receives the servo lock request from the MPU 4 (at step S211), and detects the servo information (at step S212). The disk controller 8 stores the detection result of this servo information in the RAM 10 as a value of the servo counter 10a to complete the servo lock operation (at step S213). Further, the disk controller 8 transmits the servo counter 10a to the MPU 4 (at step S214), and finishes the processing.

The MPU 4 receives the value of the servo counter 10a transmitted from the disk controller 8 (at step S205), and compares the value of the servo counter 10a with the value of the servo counter 7a (at step S206). If the value of the servo counter 10a coincides with the value of the servo counter 7a ("Yes" at the step S207), the MPU 4 determines that the servo lock operation has been normally completed, and finishes the processing. If the value of the servo counter 10a does not coincide with the value of the servo counter 7a ("No" at the step S207), the MPU 4 determines that the servo lock has been erroneously executed and outputs an "servo lock error" indicating that the servo lock operation has not been normally completed (at step S208), and finishes the processing.

As can be seen, the disk controller 8 and the MPU 4 execute servo lock operations independently of each other. Further, the values of the servo counters obtained as the servo lock results are compared, whereby it is possible to determine whether the disk controller 8 has normally completed the servo lock operation.

A head position detection program 6a used by the MPU 4 to perform a servo lock operation and an error detection program 6b used to compare the servo counters, are stored in the flash ROM 6. By reading these programs when the disk storage apparatus 2 is activated, it is possible to execute the programs.

As explained above, in this embodiment, the MPU 4 that serves as the upper unit calculates a positional relationship between the head section and each of the storage disks using the disk management data indicating the positional relationship of pieces of servo information among the storage disks, and completes a servo lock operation of the MPU 4 based on the calculation result. Therefore, the MPU 4 can execute the servo lock operation at high rate without waiting for the disk controller 8, that serves as the lower unit, to complete the servo lock operation.

Furthermore, by comparing the servo lock result of the MPU 4 with that of the disk controller 8, it is possible to detect the servo lock error of the disk controller 8.

In this embodiment, the two flash ROMs are provided in the disk storage apparatus 2, i.e., the flash ROM 6 connected to the MPU 4 and the flash ROM 9 connected to the disk controller 8 are provided independently of each other. Alternatively, the disk storage apparatus may include a single flash ROM and store the program executed by the MPU and the program executed by the disk controller in the same flash ROM.

Likewise, in this embodiment, the two RAMs are provided in the disk storage apparatus, i.e., the RAM 7 accessed by the MPU 4 and the RAM 10 accessed by the disk controller 8 are provided independently of each other. Alternatively, the disk storage apparatus may include a single RAM and allow the MPU and the disk controller to access the same RAM.

Further, if the MPU and the disk controller access the same RAM, it is unnecessary to provide two pieces of disk management data, and the MPU and the disk controller can use the same disk management data.

As explained so far, according to the present invention, the upper unit stores the disk management data as second management data indicating the positional relationship of servo information on the storage disks, predicts a servo lock result of the lower unit storing the disk management data as first management data, based on this second management data, and completes the servo lock operation of its own in accordance with the predicted servo lock result. Therefore, it is advantageously possible to allow the upper unit to perform a servo lock independently of the servo lock operation of the lower unit, and to obtain the disk storage apparatus that can execute servo lock at high rate.

Furthermore, the servo lock result of the upper unit is compared with the servo lock result of the lower unit, whereby it is possible to determine whether the lower unit has normally completed a servo lock operation. Therefore, it is advantageously possible to obtain the disk storage apparatus that can detect the servo lock error of the lower unit.

Moreover, the management data having the same contents that indicate the positional relationship of servo information on the storage disks is respectively stored in the upper unit and the lower unit, independently of each other. Therefore, it is advantageously possible to further improve operation rate.

Furthermore, the management data that indicate the positional relationship of servo information on the storage disks is shared between the upper unit and lower unit. It is thereby advantageously possible to simplify the configuration of the disk storage apparatus and minimize the disk storage apparatus.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A disk storage apparatus comprising:

an upper unit that manages data stored in storage disks; and a lower unit that controls an operation of the storage disks, the lower unit including a first storage unit that stores first management data indicating a positional relationship of servo information on the storage disks, reads the servo information on the storage disks, and compares the first management data with the read servo information to perform a servo lock, and the upper unit including a second storage unit that stores second management data indicating a positional relationship of servo information on the storage disks, wherein the upper unit includes a servo lock prediction unit that calculates a value of the servo information of the lower unit from the second management data, and stores the calculated value of the servo information into the second storage unit to perform the servo lock independent of the servo lock of the lower unit.

2. The disk storage apparatus according to claim 1, wherein the upper unit further includes an error detection unit that compares the calculated value of the servo information with the value of the read servo information, and determines that an error related to the servo lock has occurred if the calculated value of the servo information does not coincide with the value of the read servo information.

3. The disk storage apparatus according to claim 1, wherein the first management data is equal in content to the second management data.

4. The disk storage apparatus according to claim 1, wherein the lower unit stores a value of the read servo information as a value of a first servo counter in the first storage unit to thereby perform the servo lock of the lower unit, and the upper unit stores the calculated value of the servo information as a value of a second servo counter in the second storage unit to thereby perform the servo lock of the upper unit.

5. The disk storage apparatus according to claim 1, wherein the upper unit receives data access requests from a host, and further includes a servo lock control unit that controls an order of the data access requests, and generates servo lock requests based on the controlled order of the data access requests, and the servo lock prediction unit calculates, in accordance with the servo lock requests, the value of the servo information of the lower unit from the management data.

6. A disk storage apparatus comprising:

an upper unit that manages data stored in storage disks;

a lower unit that controls an operation of the storage disks; and a storage unit that stores management data indicating a positional relationship of the servo information on the storage disks, the lower unit reading servo information on the storage disks, and comparing the management data with the read servo information to perform a servo lock, wherein the upper unit includes a servo lock prediction unit that calculates a value of the servo information of the lower unit from the management data, and stores the calculated value of the servo information into the storage unit to perform the servo lock independent of the servo lock of the lower unit.

7. The disk storage apparatus according to claim 6, wherein the upper unit further includes an error detection unit that compares the calculated value of the servo information with the value of the read servo information, and determines that an error related to the servo lock has occurred if the calculated value of the servo information does not coincide with the value of the servo information.

8. The disk storage apparatus according to claim 6, wherein the lower unit stores a value of the read servo information as a value of a first servo counter in the storage unit to thereby perform the servo lock of the lower unit, and the upper unit stores the calculated value of the servo information as a value of a second servo counter in the storage unit to thereby perform the servo lock of the upper unit.

9. The disk storage apparatus according to claim 6, wherein the upper unit receives data access requests from a host, and further includes a servo lock control unit that controls an order of the data access requests, and generates servo lock requests based on the controlled order of the data access requests, and the servo lock prediction unit calculates, in accordance with the servo lock requests, the value of the servo information of the lower unit from the management data.

* * * * *